United States Patent
Bennett

(10) Patent No.: US 7,792,296 B2
(45) Date of Patent: *Sep. 7, 2010

(54) ACCESS-CONTROLLED ENCRYPTED RECORDING METHOD FOR SITE, INTERACTION AND PROCESS MONITORING

(75) Inventor: Charles H. Bennett, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/051,661

(22) Filed: Mar. 19, 2008

(65) Prior Publication Data

US 2008/0310636 A1 Dec. 18, 2008

(51) Int. Cl.
*H04N 7/167* (2006.01)
*G06F 21/00* (2006.01)

(52) U.S. Cl. .................. 380/210; 380/286; 713/193

(58) Field of Classification Search .............. 713/193, 713/194; 726/1, 26–31; 380/201, 210, 286
See application file for complete search history.

(56) References Cited

U.S. PATENT DOCUMENTS

| | | | |
|---|---|---|---|
| 4,375,579 A | 3/1983 | Davida et al. | |
| 5,289,542 A | 2/1994 | Kessler | |
| 5,307,410 A * | 4/1994 | Bennett ............... | 380/256 |
| 5,568,556 A | 10/1996 | Conley | |
| 5,764,769 A * | 6/1998 | Bennett et al. ........... | 713/176 |
| 5,793,870 A | 8/1998 | Conley | |
| 5,894,521 A | 4/1999 | Conley | |
| 6,069,957 A * | 5/2000 | Richards ............... | 380/281 |
| 6,266,418 B1 | 7/2001 | Carter et al. | |
| 6,886,097 B1 * | 4/2005 | Higurashi ............... | 713/193 |
| 6,920,558 B2 * | 7/2005 | Sames et al. ........... | 713/166 |
| 7,107,448 B1 * | 9/2006 | MacKay et al. ........... | 713/171 |
| 2001/0036268 A1 | 11/2001 | Kuroda et al. | |
| 2001/0052078 A1 | 12/2001 | Kuroda et al. | |
| 2002/0004784 A1 * | 1/2002 | Forbes et al. ........... | 705/51 |
| 2002/0010679 A1 | 1/2002 | Felsher | |
| 2002/0083438 A1 | 6/2002 | So et al. | |
| 2002/0170053 A1 * | 11/2002 | Peterka et al. ........... | 725/31 |
| 2003/0021416 A1 | 1/2003 | Brown et al. | |

(Continued)

FOREIGN PATENT DOCUMENTS

EP 0494796 7/1992

(Continued)

*Primary Examiner*—Gilberto Barron, Jr.
*Assistant Examiner*—Hadi Armouche
(74) *Attorney, Agent, or Firm*—Whitham, Curtis, Christofferson & Cook, P.C.; Stephen C. Kaufman

(57) ABSTRACT

A high level of security for access to recorded information is provided by a method which includes provisioning of a trusted/protected communication linkage such as a tamper-resistant or tamper evident enclosure, a physical close coupling between information source and encryption processor and/or obfuscated code or end-to-end network encryption and encryption, possibly symmetrical, of the information to be recorded by a preferably random session key or segment key. The session key or segment key may then be encrypted, preferably asymmetrically, by a secure key which may be shared or access thereto shared in accordance with any desired security policy. Use of a public key or public key/private key infrastructure also provides for authentication of the recorded information.

5 Claims, 3 Drawing Sheets

U.S. PATENT DOCUMENTS

2004/0117615 A1* 6/2004 O'Donnell et al. ........... 713/155
2004/0221172 A1* 11/2004 Stamos et al. ............... 713/200
2005/0086447 A1* 4/2005 Miyamoto et al. .......... 711/163

FOREIGN PATENT DOCUMENTS

| | | |
|---|---|---|
| EP | 1162617 | 12/2001 |
| EP | 1164588 | 12/2001 |
| JP | 10015230 | 1/1998 |
| JP | 10283270 | 10/1998 |
| JP | 2002304807 | 10/2002 |

* cited by examiner

ACCESS-CONTROLLED ENCRYPTED RECORDING METHOD FOR SITE, INTERACTION AND PROCESS MONITORING

BACKGROUND OF THE INVENTION

1. Field of the Invention

The present invention generally relates to encrypted recording of information such as audio and/or visual information and, more particularly, to limiting access to and providing authentication of recorded information, especially when recorded for documentation purposes.

2. Description of the Prior Art

Memoranda of transactions, circumstances or occurrences have been known since antiquity. However, the veracity of any written record can easily be called into question and, even providing for such authentication as contemporary notations by witnesses attached to the same document, often does not necessarily remove all question in regard to the veracity of the content of the writing. Further, by its nature, a writing cannot convey the entirety of the circumstances and other collateral information which is available at any given time and which may have some relevance to the information recorded.

In recent years, other recording media such as sound and/or video recordings, developed to a high degree of sophistication and high fidelity of reproduction, such as for education and entertainment purposes, have been used to provide more complete documentation of a particular occurrence such as for the purpose of analyzing sports and other performance techniques, authenticating wills, documenting procedures such as medical operations and police interrogations, documenting conditions and results of experiments and manufacturing processes, documenting in-camera judicial proceedings and business negotiations and the like to provide a more complete and unambiguous record and allow verification and/or detection of ancillary conditions possibly giving rise to apparently inconsistent results and the like.

Such recordings are also generally deemed indispensable for surveillance for security (e.g. documenting access to secure areas), crime deterrence and/or identification of possible perpetrators and other purposes. However, such surveillance must often be done more or less surreptitiously to achieve the desired result and/or to avoid such surveillance from being defeated. At the same time, in many societies, including that of the United States, there is a substantial expectation of privacy by individuals, particularly in regard to their actions and utterances. Thus, the expectation of privacy is in direct conflict with the making of recordings for documentation, study or surveillance purposes.

In many instances such as monitoring of bank lobbies, commercial stores and the like, it has been considered sufficient, in the past, for recording to be performed selectively under control of security personnel monitoring live video signals from a plurality of cameras and only recording events of interest (e.g. where observed activity may justify documentation) or that any recording made be kept private in the absence of some compelling reason for revealing it by the entity making the recording and for the recording to be destroyed after a relatively short period of time if an incident of interest is not, in fact, recorded. For example, video surveillance may be recorded on a continuous tape loop of predetermined duration so that only the most recent period of predetermined duration (e.g. several minutes) recorded over earlier recorded signals will be available.

However, particularly since the development of solid-state image sensors and improved microphone technology in the last few decades, the cost of audiovisual pick-up devices (e.g. cameras, microphones and devices capturing both image and sound) has been greatly reduced and availability has become widespread, evidently encouraging the use of audio and/or visual recording in an increasingly broad range of applications. At the same time, the size of such devices has been much reduced to the point that such audiovisual pick-up devices may be much more easily concealed and employed in greater numbers than only a very few years ago or used in locations to monitor conditions or procedures not previously possible. This increased facility for making of recordings has led to increased sensitivity as to whether or not a recording is or should be made in particular situations unless strict limitation of distribution and playback of the recording can be assured. On the one hand, if a recording is not made, legitimately interested parties may not be able to ascertain or resolve disputes or differing interpretations of particular circumstances such as a business negotiation, medical or manufacturing procedure, experiment or criminal act or the like. On the other hand, if a recording capable of misuse is made but could become available to persons capable of misusing it, privacy rights and expectations of privacy may be violated, the recording may be used for criminal or anti-social purposes such as harassment or blackmail, or the integrity of judicial proceedings may be compromised. At the present state of the art, these conflicting interests cannot be harmonized. On the contrary, as society, commerce and technology become more complex and the making of recordings facilitated, there is increased incentive for recordings to be made notwithstanding the fact that greatly increased efforts to limit distribution and performance of such recordings must also be made and, perhaps more importantly, the efficacy of such efforts must be assured. Conversely, such increased efforts and any increased efficacy thereof may engender the possibility of the appearance of authenticity of information which has been artificially created or for which authorization for access to an authentic record has not been duly provided while interested parties, who may be involved in the development of the information, must be confident of the identification of their correspondents during the development of the information.

Encryption of recordings is known for avoiding piracy, unauthorized access (e.g. pay-per-view programs) or copying (e.g. making counterfeit recordings). However, such encryption and access authorization arrangements are directed to allowing access to particular copies of the recorded material substantially transparently upon certain conditions (e.g. payment of a fee) being met by any member of the public and not to complete sequestration of the original recording absent authorized access by particular interested parties.

In particular, it is known to secure original recordings by symmetrical encryption with random session keys. As is known in the art, symmetrical encryption techniques use the same key for both encryption and decryption. Symmetrical encryption and decryption is fast but requires the sender and receiver to share a key beforehand by well-known agreement schemes such as Diffie-Hellman key agreement techniques or by use of public key encryption which has the additional benefit of providing authentication by digital signatures.

In order to secure communications over communication links where information is particularly subject to interception, asymmetric encryption techniques, often referred to as public/private key infrastructures have been developed. In such asymmetric encryption techniques, an intended recipient is able to specify a key to a potential sender of a message for encryption of the desired information. However, once encrypted with such a key, decryption of the information is possible only with another key which known to the intended recipient but is not known to the sender or others and is not communicated over the communication link. Therefore, two parties can communicate in a secure manner since only the intended recipient can decrypt the information to the exclusion of all others.

So-called secret sharing techniques are also known in which secret, important information, such as a decryption key for encrypted data can be divided into a number of shares, one unique divided portion of the key being provided for each interested party. The divided portions of the key can be arranged so as to implement any prescribed access policy, for example, allowing the secret information to be recovered from share 0 alone or at least two of shares 1, 2 and 3. In general, any set of shares sufficient to decrypt the secret under a given access policy will be referred to as a quorum under that policy.

SUMMARY OF THE INVENTION

It is therefore an object of the present invention to provide encryption for recordings as they are made such that the only recording made will be in encrypted form.

It is another object of the invention to provide for limitation of access to recorded information to a party (e.g. a person or administrative entity) or closely but flexibly defined group of parties among whom a sharing of access rights has been previously agreed upon.

It is a further object of the invention to provide for authentication of recorded information, including group meetings and communications over a digital network such as a so-called chat room, as a guard against tampering, editing or other form of falsification while providing participants with confidence of the identities of their correspondents.

In order to accomplish these and other objects of the invention, a recording method is provided including a data acquisition device, an encryption processor close-coupled with the data acquisition device by a trusted/protected communication linkage, a controller for controlling encryption by the encryption processor using an encryption key to produce encrypted data, storage for recording the encrypted data, and an arrangement for controlling access to data stored in the storage with a right of access key.

In accordance with another aspect of the invention, a method of producing a recording of an information stream which can be authenticated and produced in association with one or more interested parties is provided comprising steps of selecting a master policy that specifies, for each time segment of the information stream, the rights of each interested party to control decryption and authentication of a corresponding segment of the information stream, protecting the information stream from disclosure prior to encryption, generating segment keys for encrypting each segment of the information stream, encrypting respective time segments of the information stream with corresponding segment keys to form an encrypted information stream, destroying the information stream, distributing the encrypted information stream to interested parties, generating a keyshare log comprising, for each time segment, a set of keyshares implementing the master policy for respective time segments of the information stream, and distributing respective keyshares to interested parties for respective time segments of the information stream.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
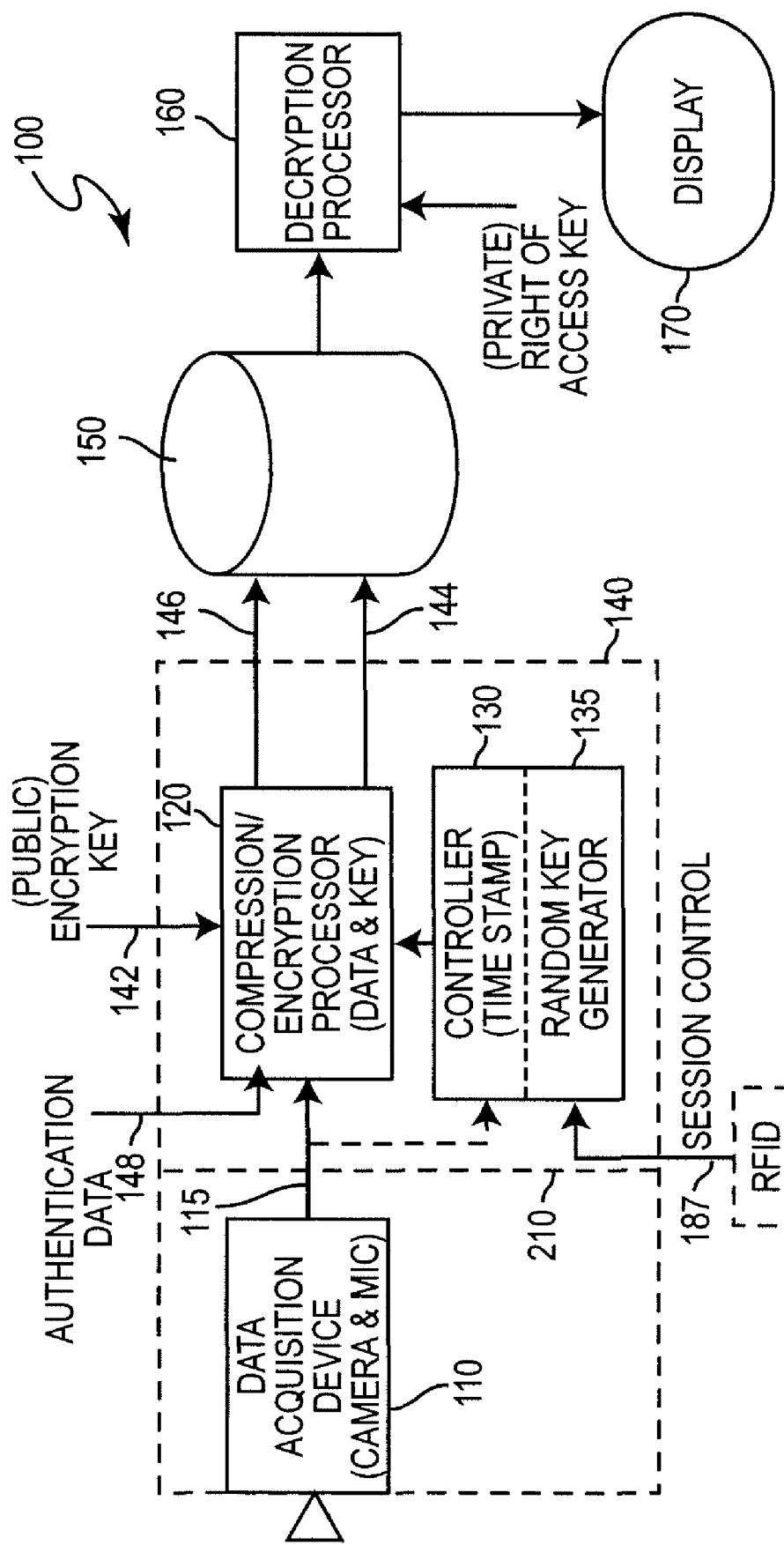
FIG. 1 is a high-level block diagram of a preferred form of the invention.

Referring now to the drawings, and more particularly to FIG. 1, there is shown a high-level block diagram of a preferred arrangement 100 in accordance with the invention. It should be understood in the following discussion of the invention that while preferred encryption methods, keys and the like may be mentioned, the invention may be practiced with any form of encryption, known or foreseeable, which is deemed to provide a level of security considered to be adequate for the circumstances to which the invention may be applied and which may or may not consider such factors as potential value and/or sensitivity of the recorded material, the identity and number of persons who may control or be granted access, the volume of the material to be recorded, segmentation for different access authorizations and the like. In other words, while some types of encryption and access authorization control will be discussed as preferred, the particular details of encryption and access authorization control which may be used are unimportant to the successful practice of the invention in accordance with its basic principles. Those skilled in the art of signal encryption will be able to practice the invention to good and sufficient effect by appropriate choice of encryption and access control techniques which thus need not be described in detail herein.

Conversely, while the invention may be practiced in accordance with its most basic principles in a wide variety of ways and yielding some enhancement of security over currently used systems, some possible embodiments of the invention will provide levels of security and resistance to tampering or data falsification which are not considered adequate in most applications contemplated by the inventor and yet may be advantageous in some applications by virtue of their simplicity. Other variant forms of the invention in accordance with its basic principles will yield improved security or resistance to tampering or data falsification but may require increased complexity such as specially designed hardware or control thereof or entail other design compromises which may not be advantageous. Some variations of the invention of this latter type will be discussed briefly herein but will be indicated as not preferred but which are, nevertheless, within the spirit and scope of the invention. It is to be understood that an important aspect of the invention is considered to reside in the combination of encryption and access authorization control features which synergistically provide substantially increased security of recorded data with a minimal degree of complexity and cost and which are largely compatible with recording systems currently in use and to which the invention may be readily applied.

It may be helpful to an understanding of the invention as well as the terminology of the following description to note that session keys, as that term is generally understood in the art (denoted by $K_p$ hereinafter), are used only temporarily such as in an end-to-end encrypted trusted server environment and are associated with communications between the server and a particular user. After the conversation or communication is over, session keys are discarded. As will be detailed below, to increase security and/or implement different security policies, the invention provides for a communication to be divided, arbitrarily or in response to particular conditions or circumstances, into different time segments each of which may be handled much in the manner of a session but with different keys and possibly different access rights for each time segment. However, in accordance with the invention, the keys used for respective time segments are not discarded but encrypted and stored in association with the encrypted information of each time segment for decryption and/or authentication and thus the term "session key" as applied to the encryption of respective time segments in accordance with the invention may be a confusing extended usage. Accordingly, the term "segment key/" (denoted Zt) will be used in reference to keys having these particular distinctions from session keys where those distinctions may be important to an understanding of the invention. On the other hand, the term "session keys" may be used in a collective sense to include segment keys as applied to respective time segments although, in accordance with the invention, keys so referenced may be stored, at least in an encrypted form (whereupon the unencrypted key is preferably destroyed).

The basic goal of the invention is to provide an arrangement for generalized data capture in which unencrypted data is not accessible without substantial difficulty (e.g. obtaining physical access or hacking) and/or ease of detection of such tampering while closely but flexibly limiting later access to and/or authentication of the recorded (encrypted) information. Accordingly, The basic core components of the invention, not all of which are required in any given embodiment and each of which may be implemented in a variety of forms, are a master security policy, a data acquisition apparatus, one or more arrangements providing protection against unauthorized disclosure of unencrypted information and a protected control unit.

The master security policy specifies who will be accepted as an interested party and how their rights to permit or restrict access to an authenticated unencrypted recording or transcript will be assigned. The master security policy also specifies how the recording or transcript or time segments thereof and transitions from one time segment to the next will be defined. The data acquisition apparatus will typically be one or more video cameras and microphones or a combination thereof but may be any type or combination of types of sensor or transducer of one or more physical parameters such as pressure, temperature, voltage, current, stress, etc. capable of capturing the data of interest. The protection against unauthorized disclosure of unencrypted information principally involves a communication link between the data acquisition apparatus and the control unit including the apparatus for encryption and storage of data. This protection of the communication link may be in the form of a tamper resistant or temper evident enclosure for the camera and encryption processor, physical close coupling of the data acquisition apparatus and the encryption processor (e.g. so that the integrity thereof may be effectively monitored) use of hard-to-decompile object code (also referred to as obfuscated code) in the control unit, and/or location of the control unit in a trusted server or trusted process or device running on a server or pool of servers accessed through end-to-end encrypted links over a network such as the internet or the like; all of which may be collectively referred to hereinafter as a trusted/protected linkage.

It should be understood that such protection comprehends both front end protection of data between acquisition and encryption (either for network transmission or for increasing security against unauthorized access in accordance with the invention) and back end protection against subverting the function of the controller to cause unauthorized decryption. The controller provides a number of functions to establish sessions or time segments, control encryption for limiting access in accordance with the master security policy, provide authentication data such as time stamps, digital signatures, administration of keys including generation and destruction thereof and generation of random or pseudo random numbers used for that purpose, detection of tampering and the like.

The control unit may have one or more of a master private key, a random or pseudo random number generator, a keyshare generator which divides the session key or segment key to be provided to each interested party in each time segment such that the keyshares collectively implement the master security policy, an arrangement for destroying or erasing unencrypted data from the data acquisition apparatus as well as segment keys after they have been used for encryption and an arrangement for distributing the keyshares and encrypted versions of the recording or transcript to interested parties and other facilities as particular applications of the invention may dictate. The master private key or right of access key is used to sign the encrypted output of the system to certify that the encrypted output is in conformity with the master policy and that the session and/or time segments thereof are in proper order. The control unit is regarded as an interested party to the recording or transcript and, for convenience, is designated as party "0" and the master private key as "D0". The corresponding public key, "E0" would typically be published or registered with a certifying authority. In the case where the control unit is protected by a physical tamper-resistant or tamper-evident enclosure, the control unit would be arranged to erase the master private key when tampering was detected. The following discussion of exemplary embodiments of the invention will illustrate how these core elements of the invention may be individually implemented and integrated into a system to provide a high level of security and closely limited and administered access to captured information.

Returning to FIG. 1, a first exemplary embodiment will be discussed. It is preferred in this embodiment that a data acquisition device 110 such as a video camera and/or microphone, process parameter logging telemetry sensors or the like, and control (130) and encryption (120) processing circuitry be close-coupled such as by placement of both the data acquisition device 110 and processing circuitry 120, 130 in the same tamper-resistant or tamper-evident housing 140 or, although possibly less secure, to provide encryption processing in a device such as a laptop computer (represented by dashed line 210) connected to the data acquisition device 100 by a preferably short and readily protectable connection 115, the only location at which unencrypted data exists. In the case of using a laptop computer or the like for encryption, the software is arranged to output and/or store only the encrypted form of the data (with a suitably encrypted key) while the unencrypted data stream is discarded.

Thus, only encrypted information and an encrypted key are output either continuously or periodically, preferably in a readily accessible format for storage by a recording device 150 of an arbitrary type. It is assumed that the encrypted information can be readily accessed from storage device 150 to which additional security measures (e.g. password protection, virtual private network or the like) may or may not be applied, as desired. However, the encrypted information can only be made intelligible by use of a right of access key applied to a decryption processor 160 which receives the encrypted information, decrypts it and reproduces it on a suitable device such as display 170. That is, even when stored information is accessed it is assumed for purposes of the invention that the information should remain protected from all but the interested party accessing it and therefore should be output to the interested party in encrypted form to be decrypted locally to and under the complete control of the interested party using the right-of-access key of the interested party. Thus, if suitable protection is provided for the data originally acquired by data acquisition device 100 until it is encrypted, access to that information is made arbitrarily difficult and access may be limited in any desired manner through the use of right of access keys as will be discussed in greater detail below.

In this regard, it is possible, though difficult, to obtain data in a somewhat encrypted or scrambled order from the data acquisition device 110 consistent with the basic principles of the invention by non-raster scanning of an image pick-up tube in accordance with an encryption algorithm or bringing out outputs of a charge coupled device (CCD) in an encrypted order. However, in the latter case, only a limited number of encryption algorithms can be realized in the hardware design of a CCD sensor (which is otherwise preferred) and in either case, particularly the latter, substantial increase in cost and/or compromise of resolution is likely. Therefore, at the present state of the art, neither of these possibilities is preferred even though some level of encryption could be provided at the output of the data acquisition device 110 (e.g. on connection 115); resulting in further reduced accessibility to data prior to a more secure encryption in accordance with the invention.

In the preferred form of the invention, controller 130 includes a true random key generator 135 in the form of a physical true random number generator circuit (e.g. providing a digital signal representing random noise) or a randomness extraction algorithm applied to a preliminary run of data (e.g. video and/or audio) from the data acquisition unit 110. In theory, a pseudo-random number generator could also be used but, as is well-understood in the art, pseudo-random number generators always produce the same sequence of numbers even though numbers in that sequence will have certain statistical properties similar to true random numbers. That is, since pseudo-random number generators derive a sequence of numbers deterministically, the sequence of numbers can be much more readily developed by an adversary than if true random numbers are employed. Therefore, use of a pseudo-random number generator is not preferred.

The random number thus provided is used to generate a true random segment key as indicated at 135. This key is applied to the encryption processor 120 to encrypt the signal output from the data acquisition device 110 supplied over connection 115. Using a true random number as an encryption key assures that a different key or a plurality of cryptographically transformed versions thereof (e.g. for different users, particularly where it may be important to make a record of the user(s) who have accessed the recording) will be employed for each segment and segments can be changed at will. Therefore, obtaining a single segment key, which may be made arbitrarily difficult, as is well-understood in the art, will not compromise other segments for different recordings or even different parts of the same recording. The segment key is also encrypted in a suitable form as will be discussed below and output or stored in a known manner not important to the successful practice of the invention.

The encryption and storage of the segment key is considered to be an important but not essential feature of the invention since it allows the invention to closely limit subsequent access to the recorded information. For example, symmetrical encryption keys in which the same key is used for both encryption and (in a complementary form to provide an inverse operation) decryption are very well known and can theoretically be used in the practice of the invention but are not preferred for general applications or application to certain features of the invention as presently contemplated by the inventor.

Asymmetrical encryption/decryption keys, sometimes referred to as public and private keys have been known for a number of years and have grown out of a need to simplify secure communications over the Internet, in particular. Asymmetric keys are based on pairs of large prime numbers and, in contrast to symmetric keys, provide that information encrypted with one key can only be decrypted with a different key. Thus, a person wishing to receive a secure message over a communication link of unknown or questionable security can provide one of the keys (e.g. the "public" key) to a correspondent to perform encryption of the information while maintaining the other key (e.g. the "private" key) secret to be used locally for decryption of the message. It is thus irrelevant whether or not the "public" key is distributed, discovered or becomes generally known since it cannot be used to decrypt information encrypted through its use. Public/private key arrangements have been used successfully and found to provide a high degree of protection of data for a number of years even when the communication link is not secure.

Accordingly, public/private keys are a preferred technique for limiting access to encrypted information provided in accordance with the invention. It will be recalled from the foregoing discussion that the controller 130, including a random number generator is preferably used to provide a random key for encryption of signals developed by the data acquisition device 110 and thus provides a unique key for each time segment. This key, if a symmetrical key, or a paired key if asymmetrical keys are used, is encrypted and recorded in association with the encrypted information of the time segment. In accordance with the invention, a public key of a particular person or organization (e.g. a court or judge, which may be preferable to apply as a default) is used to encrypt the time segment key and access to the information is thus readily limited to the person or organization having the corresponding private key. That is, the person or organization having the private key can uniquely and exclusively decrypt the (time) segment key or keys so that the segment key(s) can be used to decrypt the recorded information. It should be noted in this regard that it is preferred to use symmetrical encryption and decryption with the random key in the interest of speed of decryption and then to protect the symmetrical key by asymmetrical encryption since asymmetrical decryption of the random key is performed only on a relatively short string of bits and thus can be performed rapidly, as well, while protection of the symmetrically encrypted data is enhanced by the greater security of asymmetric encrypting of the random key.

In another variant preferred form of the invention, it may be desirable to allow access rights to a selected number of members of a group. If, for example, it is agreed among a group of n individuals that access to recorded information should only be granted upon the concurrence of k members of a subset of the group (e.g. that no individual or smaller group should be able to access the information), limitation of such access can be accomplished in the following manner.

It is known to limit access to information to less than all members of a group, particularly for protection of trade secrets and similarly critical information while assuring that access to the information will not be lost due to the death or other unavailability of one of more members of the group. This can be accomplished using a known so-called k of n secret sharing scheme whereby information permitting access to a secret, in this case a segment key, is divided into n shares of which any k shares suffice to reconstruct the secret but no group of less than k shares yields any information about the secret or access thereto. This technique includes the special case of k=n, particularly applicable to telephone conversations or messages to require consent of both or all parties to the communication.

Of course, other techniques for protection of the recorded decryption key can be employed alternatively or in addition to the public/private key and/or the "k of n" secret sharing arrangements, sometimes referred to as a (n,k) secret sharing scheme, described above and which may be used individually or in combination. However, these techniques described above are preferred as having proven highly effective and secure over a number of years and are well-accepted by users while they may be implemented in a simple manner with well-understood software and/or hardware. These two techniques (which may each be implemented several times in plural levels depending on the level of security and the complexity of the access structure needed or desired) will be sufficient for virtually all right of access authorizations which may be presented in the course of implementation and practice of the invention.

As an example of an application of the invention, consider audiovisual surveillance of a public street in a region where numerous criminal incidents had recently taken place or which may be considered as a likely location for activity by a serial criminal. It is also assumed for purposes of this example that several data acquisition devices are employed, connection 115 can be suitably protected and encryption of a number of data streams corresponding to the number of data acquisition devices is performed by a single encryption processor 120 and controller 130 embodied in a single PC or laptop using motion detection or the like to limit the encryption processing and recording medium space required. The unencrypted input signal reaching the computer is immediately compressed in accordance with an accepted standard such as the MPEG (Moving Picture Experts Group) standard and encrypted using the random key developed in response to random number generator 135. Rights and expectations of privacy by the general public may be largely satisfied by providing the only right of access to a court or judge and thus the encryption key for encrypting the segment key would be chosen as the public key of such a court or judge to limit access to the recorded information thereto. (In such a case, the court or judge could also be regarded as a group of one with only its own private key being the only key share provided in accordance with a secret sharing scheme. Implementation of an access policy with a secret sharing scheme but only one share initially provided may be convenient or advantageous where the single initial right of access could have the capability of granting other rights of access.) The court or judge could then, if access is considered to be justified by, for example, some evidence of the anticipated criminal activity, use the corresponding private key to obtain the segment key (s) and decrypt the recorded information. Security can be increased by changing segments and (random) segment keys on an intermittent basis so that only a suitably short portion of the recording, possibly one second or less, may be decrypted with any given segment key. However, segment keys can be obtained by decryption in substantially real time using a private key since only the encrypted segment keys (generally 128 or 256 bits) need be decrypted using the private key even though the segment keys may be rapidly changing. Thus, an archival record of the surveillance could be made while limitation of access under control of a judicial or other trusted authority will largely satisfy rights and expectations of privacy of the general public.

Figure 2:
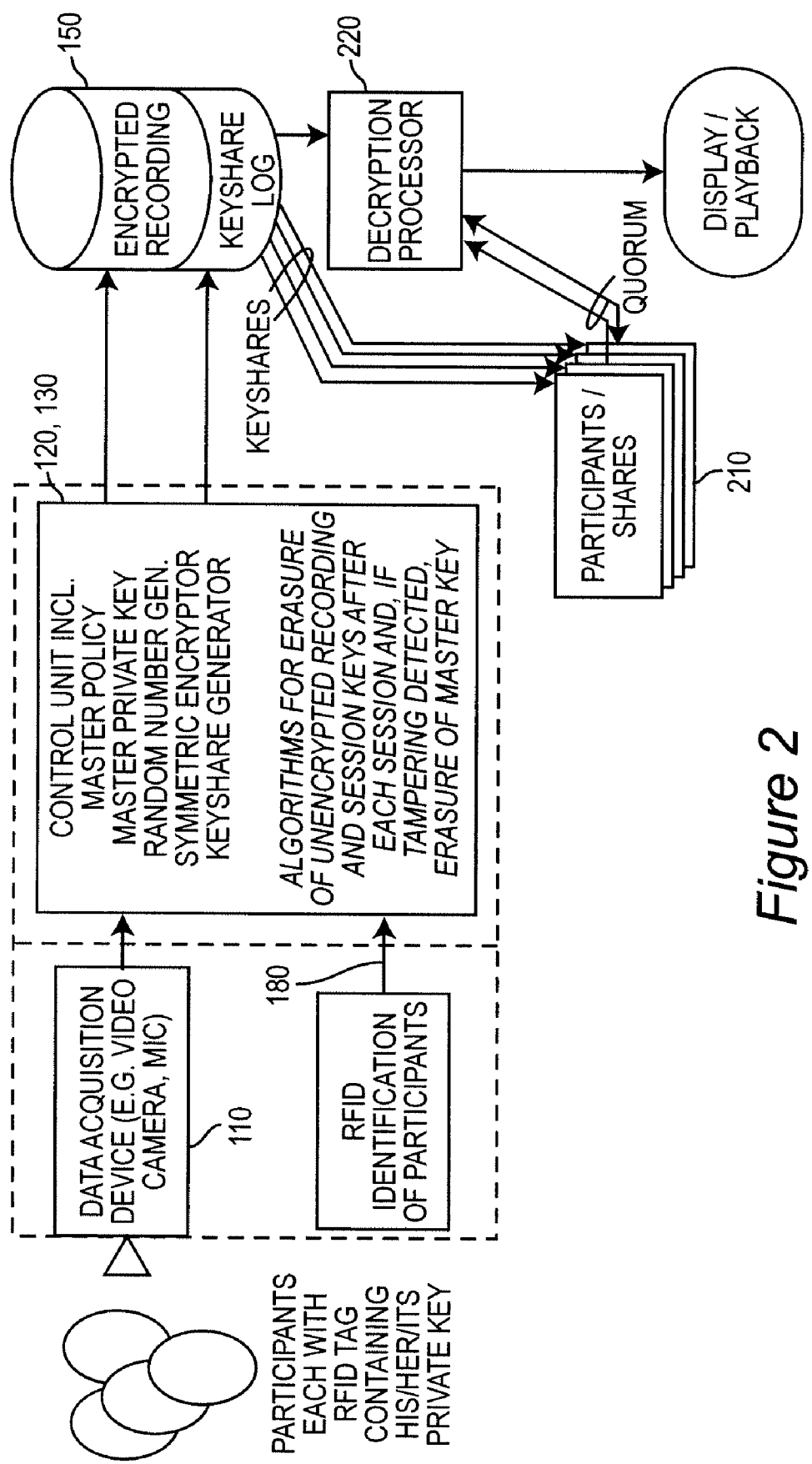
FIG. 2 is a block diagram illustrating generation of separate sessions or time segments and security policies in accordance with identification of persons involved in respective sessions or time segments comprising a particular transaction during which participants may change arbitrarily.

Another example of a preferred application of the invention would be to record a negotiating session in which the negotiators and the number thereof may change randomly is illustrated in FIG. 2. It is assumed for purposes of this example, that it is agreed in advance that, for example, one-half of the participants in the negotiations at any given time must concur in access to the recording except during periods where one or two particular negotiators are present, concurrence of three-quarters of the negotiators is required for access. In this case, the identity of the negotiators may be made known to controller 130 by some ancillary security device 180 (e.g. biometric control of access to the negotiation location or even the simple expedient of radio frequency identification (RFID) tags to detect ingress and egress from the negotiation. Interactive (challenge/response) techniques could be used to identify parties more securely, in particular, preventing replay attacks. Regardless of the technique of participant identification, as each party, p, is identified, a PKC (public key cryptography) public key, Ep, of that party is sent to the controller, possibly with a certificate of a certifying authority (CA). Then, in response to any change in the negotiators present, a new session/time/segment with a new randomly chosen segment key is established and a corresponding new security policy is implemented to correspond to the particular negotiators present which is embodied in a new encryption key for the new segment key. Therefore, for example, a given group of the negotiators present may be able, by presentation of their respective private keys 210 to decryption processor 220, to access only particular time segments of the recording where they represent one half or three-quarters of the negotiators present (e.g. a quorum) during each particular time segment. In such a case, for example, a private key capable of decrypting the respective session keys would be issued and used by the decryption processor 220 only in response to a quorum of private keys for each respective time segment.

As a simple example illustrated in FIG. 2, assume a negotiation involving three participants, 1, 2 and 3 is to be documented using the invention and the negotiation will have two time segments: a first in which only participants 1 and 2 are present and a second in which only participants 2 and 3 are present. Also assume that it is agreed that a Judge, j, will be allowed to access the entire recording or transcript. Let Z1 and Z2 denote the random segment keys for the respective time segments and let Sp(.) denote the function from which the share of each party, p, of the segment key is calculated.

The encrypted recording would comprise two segments, the first encrypted with key Z1 and the second with key Z2. The keyshares would then preferably be distributed in the form of a keyshare log defining the keyshare in order as:

Segment 1: Ej(Sj(Z1)), E1(S1(Z1)), E2(S2(Z1))
Segment 2: Ej(Sj(Z2)), E2(S2(Z2)), E3(S3(Z2)

Thus the share for the Judge is essentially Zt, the complete information to decrypt time segment t comprising both time segments 1 and 2. The sharing functions are defined in accordance with the master policy to give appropriate control to the other participants such as requiring the consent of all parties present at any given time to allow recovery of the segment key for the respective time segments or sessions and consequent decryption of the recording or transcript segments. To certify the proper administration of the master security policy and ordering of segments, the control unit would digitally sign the encrypted recording and keyshare log with its own secret key D0.

Figure 3:
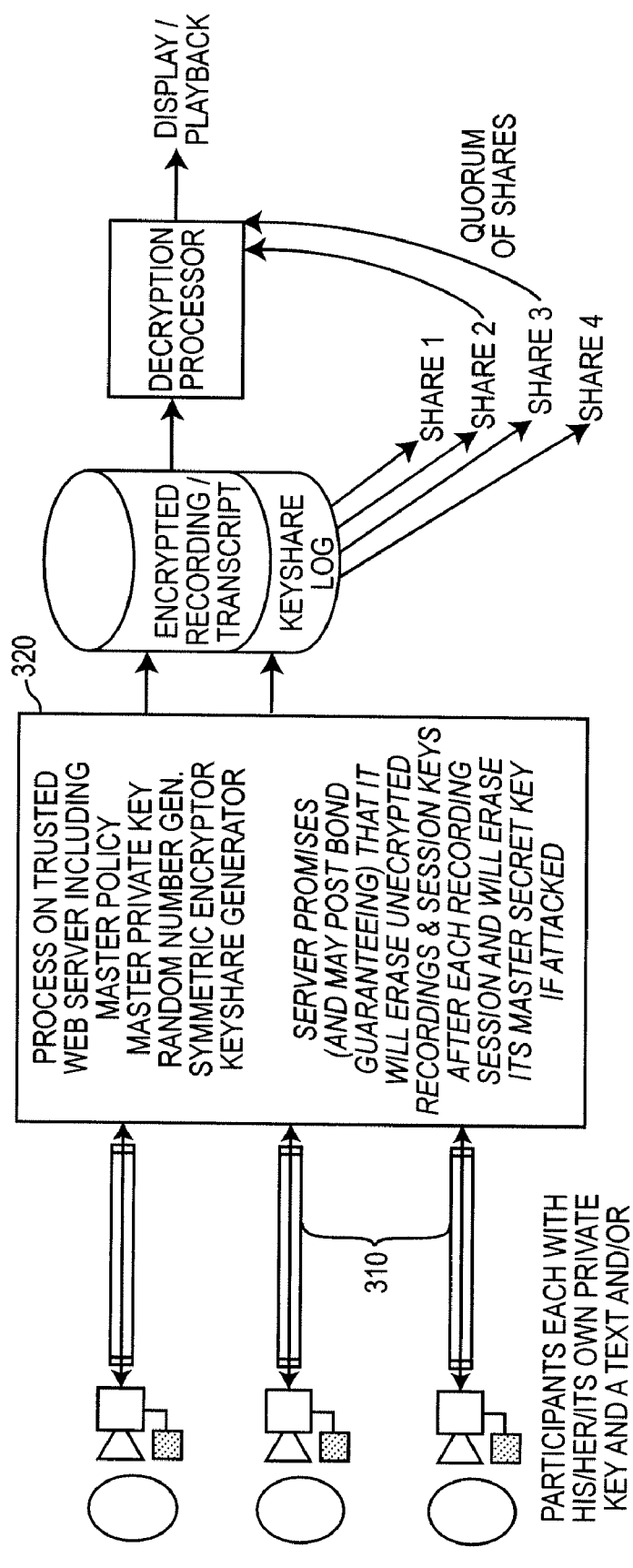
FIG. 3 is a block diagram illustrating variations of the invention including use of a plurality of information capture devices and use of a trusted communication link and server.

Another embodiment application of the invention, as illustrated in FIG. 3, would be an audio, audio-visual, and/or text teleconference or chat room among interested parties in remote locations each communicating via an end-to-end encrypted link (310) with a central trusted Web server 320. Each party would be able to see and/or hear all the utterances or messages in order during the session, but the server would accumulate and generate an authenticated encrypted transcript accessible only in accordance with an agreed master access policy, such as requiring the permission of a majority of parties present to generate an unencrypted authenticated version of any time segment. Alternatively a separate time segment could be established for each utterance, and the speaker's permission could be required to access it.

It should be understood that, in this application of the invention, an unauthorized recording might be made locally by one or more participants. In the case of a text chat room, such a locally generated transcript, made by cutting and pasting the various parties' text messages in the proper order, would be physically identical to a correct transcript. However, any transcript so generated would not have the server's digital signature; therefore a third party would have no reason to trust it, as it might just as well have been made by pasting together a false sequence of utterances.

In this context, conventional end-to-end encryption, in which the trusted server first mutually authenticates itself with each party p, then negotiates a separate random session key Kp with each party p to symmetrically encrypt and/or authenticate all messages between party p and the server during the chat or recording session, provides each party p with non-transferable confidence that the other parties' utterances that it hears relayed by the server are correct, but does not allow party p to prove this to anyone else, e.g. a newspaper. Non-transferable authentication may also be achieved by a other techniques, such as undeniable signatures (e.g. R. Gennaro et. al. J. of Cryptography 13(4) 397-416, 2000), Chameleon Signatures (H. Krawczyk et al Proc NDSS 143-154, 2000), which are hereby fully incorporated by reference).

By contrast, if a quorum of interested parties consent, they can use their shares of the segment keys to decrypt a version of the teleconference/chat room that has been digitally signed by the server. Such a signed transcript has evidentiary value in that (so long as the server is trusted to have executed its role properly) it may be used to convince a judge or other person of the identities of the parties present and the contents and sequence of their utterances.

As an example in more detail of one way to implement the invention:

1. Each party p mutually authenticates itself with the server and establishes a random an end-to-end symmetric session key Kp. This can be done by well-known techniques, such as are used in virtual private networks or VPNs.

2. Each party p uses Kp to symmetrically encrypt all his/her own utterances (e.g. text messages from p in a chat room or segments of an audio/video teleconference recorded at p's location) and sends them to the server. The server then decrypts the utterance and forwards it to each other party q (and possibly also to the originating party p for confirmation). These outbound messages from the server are not signed by the server, but are merely symmetrically encrypted using the recipient's end-to-end key Kq. Assuming the server is trusted by all the parties, this suffices to give each party confidence that it is dealing through the correctly identified server and correctly identified other parties, that its own utterances have been properly forwarded to the other parties, and that other parties' utterances that it hears from the server are authorized by the other parties. However this confidence is nontransferable, because party p is free to generate arbitrary false utterances and encrypt them by Kp.

3. At the end of the conversation the server divides the conversation into appropriate time segments t, each comprising one or more utterances, symmetrically re-encrypts each segment t with a random segment key Zt chosen by the server, and broadcasts or distributes to all the parties the entire encrypted conversation, comprising the sequence of symmetrically encrypted segments. It also generates and broadcasts a signature for the encrypted conversation, for example Ds(h) where h is a hashed digest of encrypted conversation and Ds(.) is the server's asymmetric private key encryption function.

4. The server generates and stores an access rights log for the conversation, specifying for each time segment t which subsets of parties constitute a quorum for decrypting and authenticating that segment.

5. Thereafter the server will entertain requests from sets of parties to enable authenticated decryption of segments of the conversation. Upon receiving a digitally signed request from each of a quorum of parties for time segment t, the server will release to all the requesting parties a digitally signed message (e.g. (t,Zt,Ds(t,Zt))) containing the session key Zt for that segment. The server stores the signed requests, to protect itself from false accusations of having released session keys improperly. The server may post a bond against releasing session keys improperly, to be forfeit if anyone can produce a signed message from the server containing a session key for which the server cannot produce a quorum of signed requests.

6. Alternatively (to 5) the server distributes shares of the segment keys to each interested party in accordance with the master policy as described earlier. This spares the server the need to retain the segment keys and access rights log and to participate in subsequent decisions to release segment keys, but does not protect the server from false accusations of having released segment keys improperly, and therefore could not be used in connection with the server posting a bond against doing so.

As a perfecting feature of the invention, it should be understood that the invention is fully compatible with other known security enhancements such as time bracketed authentications much in the manner alluded to above for different security policies for different constituencies of negotiators but also including time stamps such that a person seeking to access a portion of a recording must specify both a time period of a session and use a particular private key corresponding thereto. Time stamps also serve to authenticate the recorded information since they are extremely difficult to recreate and tampering is generally easy to detect. Alternatively or in addition thereto, digital signatures may be applied to the recorded information in accordance with individual encryption sessions to further assure authenticity and freedom from tampering or modification of the recorded information. These and other security enhancements (e.g. inclusion of authentication data 148 from a trusted source referred to as "challenges" and maintaining a digest of the recorded material in a trusted repository) such as are disclosed in U.S. Pat. No. 5,764,769 to Bennett et al., assigned to the assignee of the present invention and which is hereby fully incorporated by reference may be included.

As another perfecting feature of the invention the controller could maintain and handle multiple information channels (e.g. separate audio, video and measured parameter data) with a different master security policy for each. The invention could also be used in combination with access authorization controls to provide, locally or remotely, certain actions and consents of parties to perform such actions as opening a safe, obtaining access to databases other than that used for the encrypted recording or the like. The invention can also be combined with other authentication arrangements for the encrypted recording/transcript such as time bracketed authentication.

From the foregoing, it is seen that the invention may be simply and flexibly implemented in a manner consistent with current data acquisition and recording devices while yielding a potentially high degree of security and assurance of observance of rights and expectations of privacy. The use of a (e.g. random) session or segment key for each session or time segment assures that a high level of difficulty and/or sophistication for an unauthorized person to gain access to a given recording or even more than a probably insignificant portion (e.g. short session or segment thereof) while the use of an externally applied key (e.g. using public key or public/private key infrastructure) for encryption of the session or segment key greatly facilitates implementation of any desired right of access policy and authentication as well as synergistically providing an increased level of security and flexibility of access authorization.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of producing a recording of an information stream which can be authenticated, said stream of data being produced in association with one or more interested parties which are in the presence of each other or authenticated to each other over a network through a trusted process or device running on a server or pool of servers, said method comprising steps of selecting a master policy that specifies, for each time segment of the information stream, the rights of each interested party to control decryption and/or authentication of a corresponding segment of the information stream, generating segment keys for encrypting or authenticating each said time segment of said information stream, after encryption of the information stream into encrypted form, destroying the unencrypted information stream, distributing the information stream in encrypted form to interested parties, generating a keyshare log or access right log comprising, for each time segment, a set of keyshares or access rights implementing said master policy for respective time segments of said information stream, and distributing respective keyshares to or evaluating access rights of interested parties for respective time segments of said information stream.

2. A method as recited in claim 1 including the further step of encrypting respective time segments of said information stream with corresponding segment keys to form an encrypted information stream.

3. A method as recited in claim 1 including the further step of digitally signing the encrypted information stream and keyshare log or access rights log by said trusted process or device.

4. A method as recited in claim 1 including the further steps of receiving through said trusted process or device requests for access to segment keys for at least one time segment from interested parties, and releasing said segment keys if said requests represent a quorum under said master policy.

5. A method as recited in claim 1 wherein said information stream includes information providing non-transferable confidence in the identities of interested parties and the contents and integrity of the information stream.

* * * * *